C. O. HENDERSON.
VEHICLE TIRE.
APPLICATION FILED SEPT. 24, 1908.

940,014.

Patented Nov. 16, 1909.

Witnesses
M. Subler.
Carolyn M. Ohestald.

Chester O. Henderson,
Inventor

By
his
Attorney

UNITED STATES PATENT OFFICE.

CHESTER O. HENDERSON, OF DAYTON, OHIO, ASSIGNOR OF ONE-THIRD TO WILLIAM A. PICKENS, OF INDIANAPOLIS, INDIANA.

VEHICLE-TIRE.

940,014.  Specification of Letters Patent.  Patented Nov. 16, 1909.

Application filed September 24, 1908. Serial No. 454,632.

*To all whom it may concern:*

Be it known that I, CHESTER O. HENDERSON, a citizen of the United States, residing at Dayton, in the county of Montgomery and State of Ohio, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in rubber tires for vehicle wheels, and comprises a non-pneumatic cellular rubber tire having the desirable features hereinafter described and claimed.

The object of the invention is to provide a rubber tire having the requisite resiliency and strength without the use of air.

Figure 1:
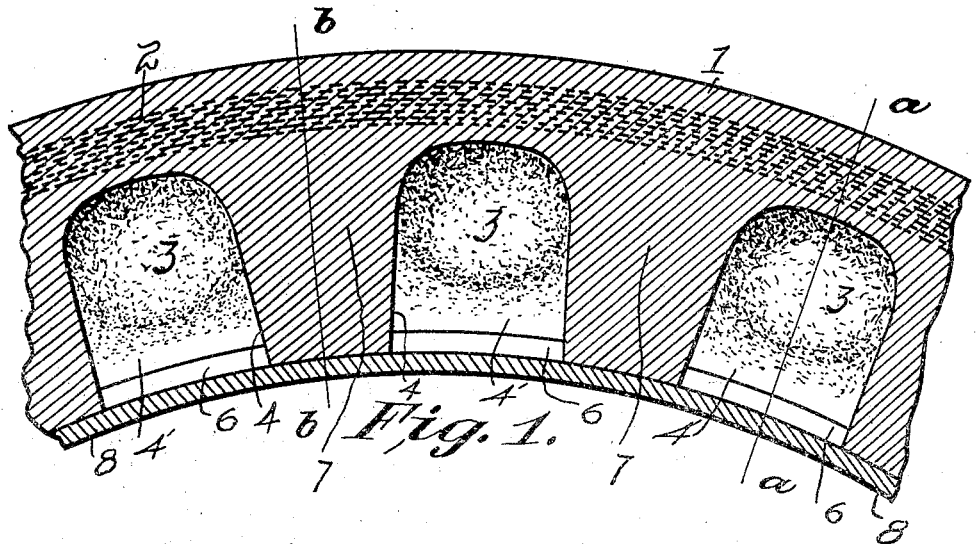
Figures 2, 3:
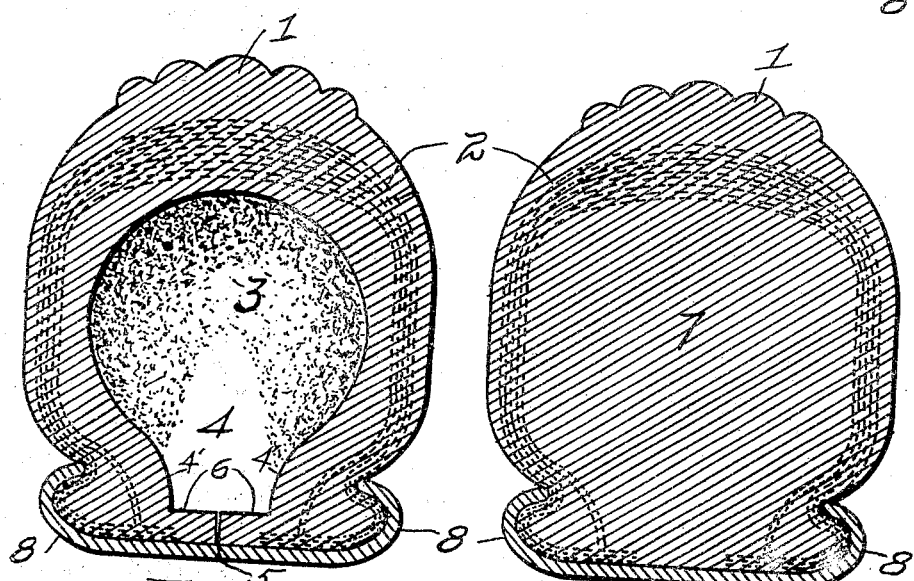

In the drawings—Figure 1, is a sectional view lengthwise of a portion of the tire taken on a line extending centrally thereof. Fig. 2, is a cross sectional view on the line *a a* of Fig. 1. Fig. 3, is a sectional view on the line *b b* of Fig. 1.

In the description, similar reference characters indicate corresponding parts.

The tire 1 is constructed of rubber reinforced by webbing 2 of any suitable fabric, the layers of which are multiplied and lie adjacent to the tread of the tire. Arranged throughout the tire equi distances apart, are a series of cells 3, the outer terminals of which lie a suitable distance from the tread surface of the tire. These cells are substantially circular in cross section, and the end walls 4 thereof extend in straight parallel walls to the extreme inner surface of the tire as clearly shown in Fig. 1. The side walls curve inwardly at the base of the tire as at 4'. The arrangement of the cells in this manner, provides a corresponding series of intervening solid portions or pillars 7. The tire thus constructed combines to a desirable extent, the necessary elasticity, strength under pressure and lightness. The tire so formed is secured to a rim 8 which is of the clencher type extending over the inner margins of the tire and effectually securing the same and closing the cells against any admission of air. The circumferential base of the tire has inwardly-extended portions 6 which abut as in Fig. 2 when the rim 8 is placed on the tire.

The object of slitting the inner circumference of the tire at the points adjacent to the cells as indicated by 5 Fig. 2, is to permit the forms to be removed from the cells in the process of molding the tire, and it will be observed that when the tire is clamped to the rim, the series of cells are closed to the admission of air.

I claim:

A rubber tire having a series of cells the side walls of which curve inwardly and terminate in abutting flanges which form the bottoms of the cells, and the end walls of which extend substantially in parallel planes and provide solid portions of the tire of substantial thickness between the cells, and a rim united to the tire and inclosing the abutting flanges.

In testimony whereof I affix my signature, in presence of two witnesses.

CHESTER O. HENDERSON.

Witnesses:
R. J. MCCARTY,
MATTHEW SIEBLER.